(12) United States Patent
Yamataki

(10) Patent No.: US 9,027,961 B2
(45) Date of Patent: May 12, 2015

(54) AIR BELT AND AIR BELT APPARATUS

(71) Applicant: Takata Corporation, Tokyo (JP)

(72) Inventor: Norio Yamataki, Tokyo (JP)

(73) Assignee: Takata Corporation, Tokyo (JP)

( * ) Notice: Subject to any disclaimer, the term of this patent is extended or adjusted under 35 U.S.C. 154(b) by 0 days.

(21) Appl. No.: 14/345,217

(22) PCT Filed: Oct. 4, 2012

(86) PCT No.: PCT/JP2012/075751
§ 371 (c)(1),
(2) Date: Mar. 14, 2014

(87) PCT Pub. No.: WO2013/073305
PCT Pub. Date: May 23, 2013

(65) Prior Publication Data
US 2014/0239622 A1 Aug. 28, 2014

(30) Foreign Application Priority Data

Nov. 15, 2011 (JP) .................................. 2011-249884

(51) Int. Cl.
*B60R 21/18* (2006.01)
*D04B 21/20* (2006.01)
(Continued)

(52) U.S. Cl.
CPC ................ *B60R 21/18* (2013.01); *D04B 21/20* (2013.01); *B60R 21/235* (2013.01); *B60R 2021/23552* (2013.01); *D04B 21/10* (2013.01); *D10B 2505/122* (2013.01)

(58) Field of Classification Search
CPC .... B60R 21/18; B60R 21/126; B60R 21/201; D10B 2505/122; D10B 2505/124; D10B 2401/041; D04B 21/20; D04B 21/202

USPC ......... 280/733, 728.1; 66/190, 192, 193, 195; 442/311, 313, 314
See application file for complete search history.

(56) References Cited

U.S. PATENT DOCUMENTS 4,096,609 A * 6/1978 Sayre .............................. 28/155
4,518,640 A * 5/1985 Wilkens ........................ 428/102
(Continued)

FOREIGN PATENT DOCUMENTS

JP H06-262996 A 9/1994
JP H11-348705 A 12/1999
(Continued)

OTHER PUBLICATIONS

International Search Report from the International Bureau of WIPO for International Application No. PCT/JP2012/075751 dated Jan. 15, 2013 and English translation of the same (2 pages).

*Primary Examiner* — Paul N Dickson
*Assistant Examiner* — Darlene P Condra
(74) *Attorney, Agent, or Firm* — Fitch Even Tabin & Flannery LLP

(57) ABSTRACT

An air belt having mesh webbing sufficiently strong and sufficiently expandable in the circumferential direction of a bag-shaped belt and an air belt apparatus including the air belt are provided. An air belt includes a folded member being a bag-shaped belt folded in a band shape and mesh webbing covering the folded member of the bag-shaped belt. The mesh webbing hardly expands in the longitudinal direction of the air belt, and is flexibly expandable in the circumferential direction of the bag-shaped belt. The mesh webbing is made of a raschel-knitted material. The knitted material is arranged such that the extending direction of knot portions of yarn threads and corresponds to the longitudinal direction of the air belt.

6 Claims, 7 Drawing Sheets

(51) Int. Cl.
  *B60R 21/235* (2006.01)
  *D04B 21/10* (2006.01)

(56) References Cited

U.S. PATENT DOCUMENTS

| | | | |
|---|---|---|---|
| 5,317,886 A * | 6/1994 | Prahl | 66/192 |
| 5,346,250 A * | 9/1994 | Kamiyama | 280/733 |
| 5,465,999 A * | 11/1995 | Tanaka et al. | 280/733 |
| 5,692,777 A * | 12/1997 | Tochacek et al. | 280/743.1 |
| 5,711,169 A * | 1/1998 | Leeke et al. | 66/196 |
| 6,007,092 A * | 12/1999 | Martz | 280/733 |
| 6,370,924 B1 | 4/2002 | Takeuchi | |
| 6,561,230 B1 * | 5/2003 | Ikeda et al. | 139/420 R |
| 6,641,165 B2 * | 11/2003 | Ohhashi | 280/733 |
| 6,912,877 B2 * | 7/2005 | Yokoyama et al. | 66/195 |
| 7,013,681 B1 * | 3/2006 | Ternon et al. | 66/192 |
| 7,201,024 B2 * | 4/2007 | Hirayama et al. | 66/192 |
| 7,240,522 B2 * | 7/2007 | Kondou et al. | 66/195 |
| 7,353,669 B2 * | 4/2008 | Ternon et al. | 66/192 |
| 7,418,837 B2 * | 9/2008 | Muller et al. | 66/195 |
| 7,795,161 B2 * | 9/2010 | Kano et al. | 442/76 |
| 7,845,676 B2 * | 12/2010 | Ohhashi | 280/733 |
| 7,954,847 B2 * | 6/2011 | Ohhashi | 280/733 |
| 2002/0115369 A1 * | 8/2002 | Yokoyama et al. | 442/308 |
| 2002/0125702 A1 | 9/2002 | Ohhashi | |
| 2003/0033838 A1 * | 2/2003 | Ikenaga et al. | 66/196 |
| 2004/0237599 A1 * | 12/2004 | Kondou et al. | 66/202 |
| 2006/0110995 A1 * | 5/2006 | Ternon et al. | 442/59 |
| 2009/0075542 A1 * | 3/2009 | Cuypers et al. | 442/181 |

FOREIGN PATENT DOCUMENTS

| | | |
|---|---|---|
| JP | H11-348725 A | 12/1999 |
| JP | 2000-212863 A | 8/2000 |
| JP | 2000-212864 A | 8/2000 |
| JP | 2001-322530 A | 11/2001 |
| JP | 2002-264754 A | 9/2002 |
| JP | 2008-302905 A | 12/2008 |
| JP | 2008-302906 A | 12/2008 |
| JP | 2008-302907 A | 12/2008 |

\* cited by examiner

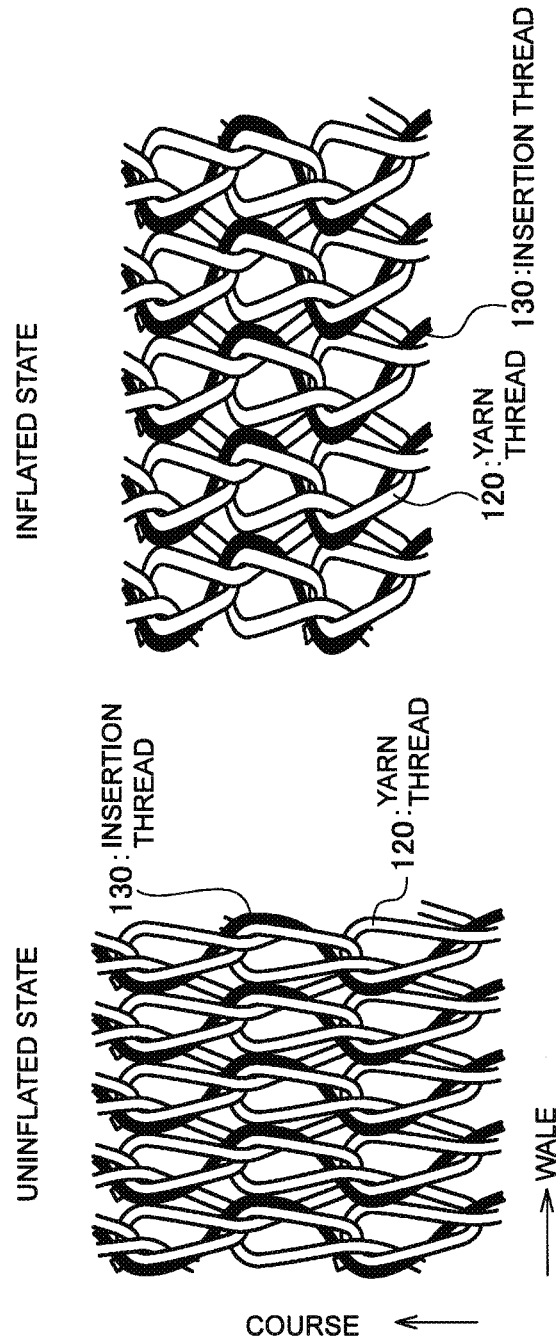

AIR BELT AND AIR BELT APPARATUS

CROSS-REFERENCE TO RELATED APPLICATIONS

This application is a U.S. national phase application filed under 35 U.S.C. §371 of International Application PCT/JP2012/075751, filed on Oct. 4, 2012, designating the United States, which claims priority from Japanese Patent Application No. 2011-249884, filed Nov. 15, 2011, which are hereby incorporated herein by reference in their entirety.

TECHNICAL FIELD

The present invention relates to an air belt for restraining an occupant of a vehicle such as a car in the event of collision or the like, particularly to an air belt including a folded member being a bag-shaped belt that inflates with gas introduced therein and is folded in a band shape and mesh webbing covering the folded member of the bag-shaped belt, with the mesh webbing configured to expand in the circumferential direction of the bag-shaped belt during the inflation of the bag-shaped belt. The present invention further relates to an air belt apparatus including the air belt.

BACKGROUND ART

An air belt apparatus is well known which restrains an occupant seated in a seat of a vehicle such as a car to the seat with an inflatable air belt in the event of collision or the like.

Japanese Unexamined Patent Application Publication No. 11-348725 describes, as the air belt, an air belt including a folded member being a bag-shaped belt that inflates with gas introduced therein and is folded in a band shape and mesh webbing covering the folded member of the bag-shaped belt. The mesh webbing is made of a knitted material configured to be flexibly expandable in the circumferential direction of the bag-shaped belt but hardly expand in the longitudinal direction of the bag-shaped belt. During the inflation of the bag-shaped belt, meshes of the mesh webbing spread in the circumferential direction of the bag-shaped belt. As a result, the mesh webbing shrinks in the longitudinal direction of the bag-shaped belt, and the air belt is reduced in length. With the air belt thus reduced in length, the air belt comes into close contact with the occupant and is capable of tightly restraining the occupant.

Knitting of the knitted material forming the mesh webbing will be described below with reference to FIGS. 6a, 6b, 7a, and 7b. FIGS. 6a, 6b, 7a, and 7b are similar in content to FIGS. 4a, 4b, 5a, and 5b of PTL 1, respectively.

FIG. 6a illustrates a normal knitted material for mesh webbing made of yarn threads 120, in which the plurality of yarn threads 120 are knitted to form a plurality of loops R. The loops R formed by each of the yarn threads 120 are arranged to be alternately shifted in position between the left side and the right side from the upper side toward the lower side of the drawing (hereinafter the vertical direction and the horizontal direction refer to the vertical direction and the horizontal direction in the drawings). The upper end of each of the loops R (the upper end of a loop $R_{B2}$, for example) winds around the lower end of a loop R of another yarn thread 120 located thereon and adjacent thereto (the lower end of a loop $R_{A1}$, for example). The lower end of each of the loops R (the lower end of the loop $R_{B2}$, for example) has the tip end of a loop R of another yarn thread 120 located thereunder and adjacent thereto (the upper end of a loop $R_{A3}$, for example) winding therearound. Thereby, the loops R are continuously arranged in the vertical direction. Further, in a string of these loops R continuing in the vertical direction, the loops R formed by a pair of yarn threads 120 and 120 adjacent to each other in the horizontal direction (120A and 120B, for example) are alternately arranged (in the order of the loops $R_{A1}$, $R_{B2}$, and $R_{A3}$ from the upper side, for example).

FIG. 6b illustrates the knitted material for mesh webbing with insertion threads 130 inserted in the knitted fabric. The insertion threads 130 are each routed from the upper side toward the lower side along the above-described string of loops R continuing in the vertical direction to alternately pass by the left side and the right side of the loops R. Each of the insertion threads 130 is routed such that, immediately before passing by a side of each of the loops R, the insertion thread 130 passes by a side of a loop R located on and adjacent to the loop R and is drawn from the rear side to the front side of the knitted material, passes the front side of the point of intersection of yarn threads 120 and 120 forming the loop R and the loop R located thereon, and thereafter passes by the side of the loop R and returns from the front side to the rear side of the knitted material. With the insertion threads 130 thus inserted in the knitted fabric, the strength of the knitted material is improved, making it possible to relatively reduce the thickness of the knitted material.

FIG. 7a illustrates a state of the mesh webbing made of the knitted material in FIG. 6b before being expanded. FIG. 7b illustrates a state in which the mesh webbing is expanded in the circumferential direction of the bag-shaped belt in accordance with the inflation of the bag-shaped belt. To form the mesh webbing with the knitted material, the knitted material is arranged such that the strings of loops R continuing in the vertical direction of the drawings extend in the longitudinal direction of the bag-shaped belt. As described above, the mesh webbing (knitted material) hardly expand in the longitudinal direction of the bag-shaped belt. When the bag-shaped belt inflates, the meshes of the mesh webbing spread in the transverse direction, as illustrated in FIG. 7b. As a result, the mesh webbing shrinks in the longitudinal direction of the bag-shaped belt, and the air belt is reduced in length.

SUMMARY OF THE INVENTION

In the knitted material in Japanese Unexamined Patent Application Publication No. 11-348725, the length of each of the loops R in the longitudinal direction of the bag-shaped belt needs to be increased to increase the amount of expansion of the mesh webbing in the circumferential direction of the bag-shaped belt.

If the length of each of the loops R is increased, however, the yarn threads become uneven, which may degrade abrasion resistance and scratch resistance of the knitted material, fire resistance of the knitted material, and restraining performance of the knitted material when covering the folded member of the bag-shaped belt, and may make the yarn threads easily raveled. If the mesh webbing is made of such a knitted material, therefore, the folded member of the bag-shaped belt covered by the mesh webbing needs to be further equipped with a cover. As a result, the air belt is increased in thickness, which may deteriorate storage performance and wearing comfortableness.

It is an object of the present invention to provide an air belt having mesh webbing sufficiently strong and sufficiently expandable in the circumferential direction of a bag-shaped belt and an air belt apparatus including the air belt.

According to a first aspect, an air belt includes a folded member being a bag-shaped belt that inflates with gas introduced therein and is folded in a band shape and mesh webbing covering the folded member of the bag-shaped belt. At least a portion of the mesh webbing forms an expandable portion that expands at least in the circumferential direction of the bag-shaped belt during the inflation of the bag-shaped belt. At least the expandable portion of the mesh webbing is made of a raschel-knitted material. The knitted material is arranged such that the extending direction of knot portions of yarn threads corresponds to the longitudinal direction of the air belt.

According to a second aspect, the air belt includes a large inflated portion that has a relatively large thickness when the bag-shaped belt inflates and a small inflated portion that is smaller in thickness than the large inflated portion when the bag-shaped belt inflates. The knitted material is arranged for the large inflated portion and the small inflated portion. The knitted material arranged for the small inflated portion is knitted such that the length of the knot portions thereof is greater than the length of the knot portions of the knitted material arranged for the large inflated portion. Thereby, the amount of expansion of the knitted material arranged for the small inflated portion in the circumferential direction of the bag-shaped belt is less than the amount of expansion of the knitted material arranged for the large inflated portion in the circumferential direction of the bag-shaped belt. In the small inflated portion, the inflation of the bag-shaped belt is restricted by the knitted material.

According to a third aspect, the knitted material arranged for the large inflated portion and the knitted material arranged for the small inflated portion are continuously knitted with the yarn threads common thereto.

According to a fourth aspect, the yarn threads forming the knitted material are made of polyester or nylon, the thickness of the yarn threads ranges from 500 to 3000 denier, and the stitch density of the yarn threads ranges from 4 to 10 courses/cm.

An air belt apparatus according to a fifth aspect includes the air belt according to one of the first to fourth aspects and an inflator for inflating the bag-shaped belt of the air belt.

In the air belt according to the first aspect and the air belt apparatus, the expandable portion of the mesh webbing covering the bag-shaped belt is made of the raschel-knitted material, and the knitted material is arranged such that the extending direction of the knot portions of the yarn threads corresponds to the longitudinal direction of the air belt.

In a knitted fabric of the raschel-knitted material, the portion of each of the yarn threads located between mutually adjacent ones of the knot portions forms the leg portion connecting the knot portions together. Further, the leg portions extend in a bifurcated manner from each of the knot portions toward one end and the other end in the longitudinal direction of the air belt. The leg portions extending from each of the knot portions toward the one end in the longitudinal direction of the air belt separate from each other in a diverging manner, and the leg portions extending from each of the knot portions 36 toward the other end in the longitudinal direction of the air belt separate from each other in a diverging manner. Thereby, the knitted material expands in the circumferential direction of the bag-shaped belt. In the air belt, therefore, the amount of expansion in the circumferential direction of the mesh webbing is practically determined by the length of each of the knot portions and the length of each of the leg portions in the knitted fabric. That is, it is possible to increase the amount of expansion in the circumferential direction of the mesh webbing by reducing the length of each of the knot portions and/or increasing the length of each of the leg portions in the knitted fabric, even if the yarn thread stitch density of the knitted material is increased.

The increase of the yarn thread stitch density of the knitted material results in improvement of the abrasion resistance, the scratch resistance, and the fire resistance of the knitted material and the restraining performance of the knitted material when covering the folded member of the bag-shaped belt. Further, the raschel-knitted material does not easily ravel even if the yarn threads are cut.

Accordingly, it is possible to configure the mesh webbing to be sufficiently strong and sufficiently expandable in the circumferential direction of the bag-shaped belt.

According to the second aspect, the knitted material is configured such that the length of the knot portions in the knitted material arranged for the small inflated portion of the air belt is less than the length of the knot portions in the knitted material arranged for the large inflated portion of the air belt, to thereby reduce the amount of expansion of the knitted material arranged for the small inflated portion in the circumferential direction of the bag-shaped belt. In the small inflated portion of the air belt during the inflation of the bag-shaped belt, therefore, the inflation of the bag-shaped belt is restricted by the knitted material, and the air belt becomes thinner than in the large inflated portion. With this configuration, it is unnecessary to change the thickness of the inflated bag-shaped belt per se between the large inflated portion and the small inflated portion of the air belt. Thus, it possible to simplify the configuration of the bag-shaped belt.

In this case, as in the third aspect, it is also possible to simplify the configuration of the mesh webbing by continuously knitting the knitted material arranged for the large inflated portion of the air belt and the knitted material arranged for the small inflated portion of the air belt. To continuously knit the knitted material by changing the length of the knot portions depending on the location, it suffices if the length of the knot portions and the length of the leg portions are changed where necessary in accordance with a program with a computer pattern (fabric) control device, with the configuration of a knitting machine per se unchanged. Therefore, the manufacturing of the mesh webbing is also simple.

As in the fourth aspect, it is preferable that the yarn threads forming the knitted material are made of polyester or nylon, the thickness of the yarn threads ranges from 500 to 3000 denier, and the stitch density of the yarn threads ranges from 4 to 10 courses/cm. With this configuration, it is possible to configure the mesh webbing to be sufficiently strong.

BRIEF DESCRIPTION OF THE DRAWINGS

FIGS. 7a and 7b are explanatory diagrams illustrating an uninflated state and an inflated state of the mesh webbing made of the knitted material in FIG. 6b.

DETAILED DESCRIPTION OF THE PREFERRED EMBODIMENTS

An embodiment of the present invention will be described below with reference to the drawings.

Figure 1:
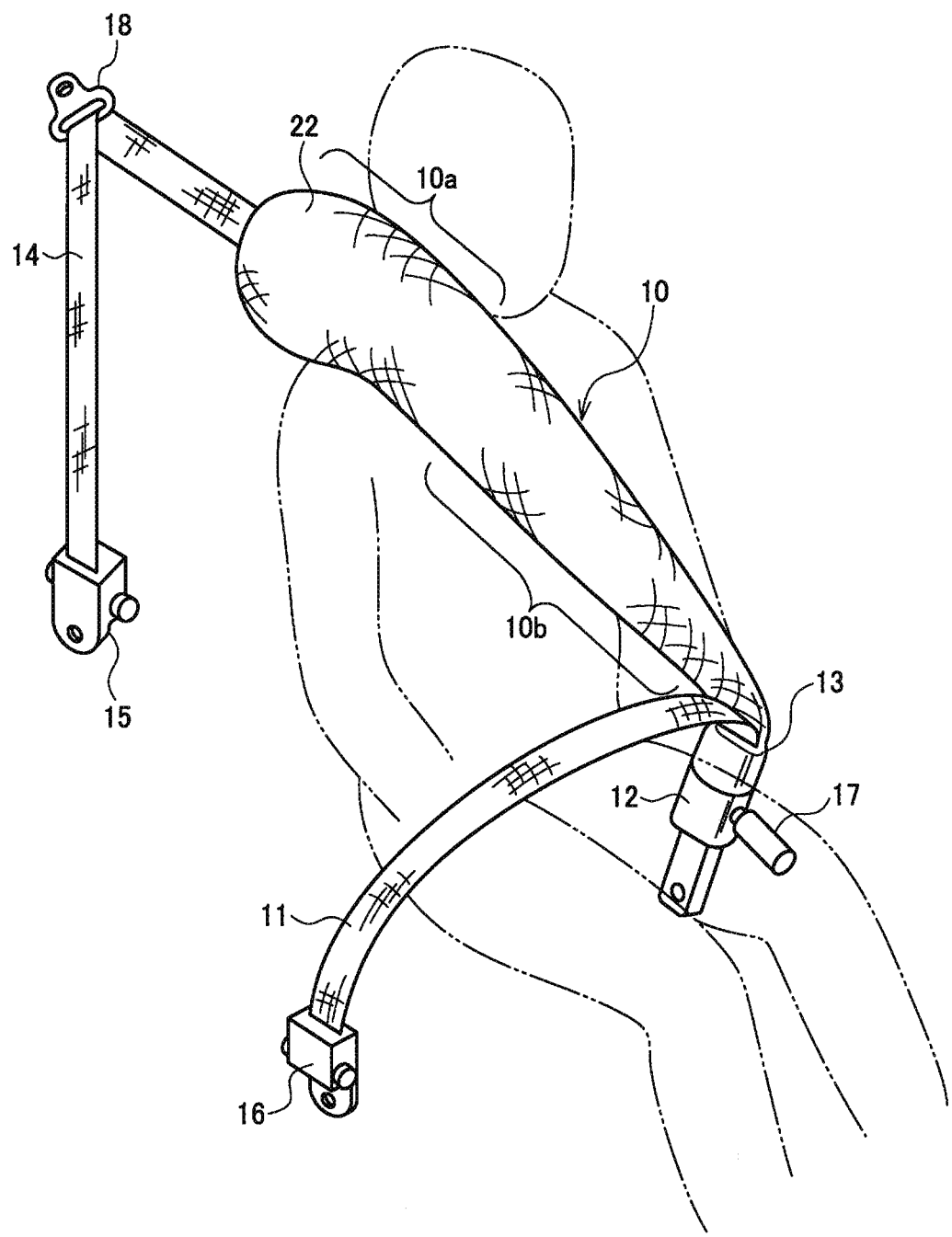
FIG. 1 is a perspective view of an air belt apparatus according to an embodiment when an air belt thereof is inflated.
Figure 2:
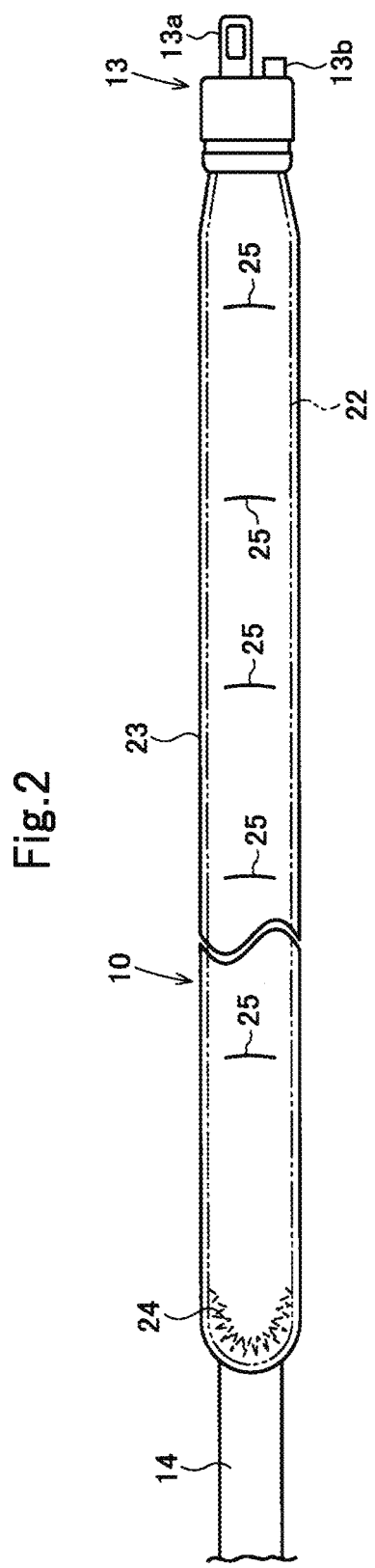
FIG. 2 is a plan view of the air belt according to the embodiment in an uninflated state.
Figure 3:
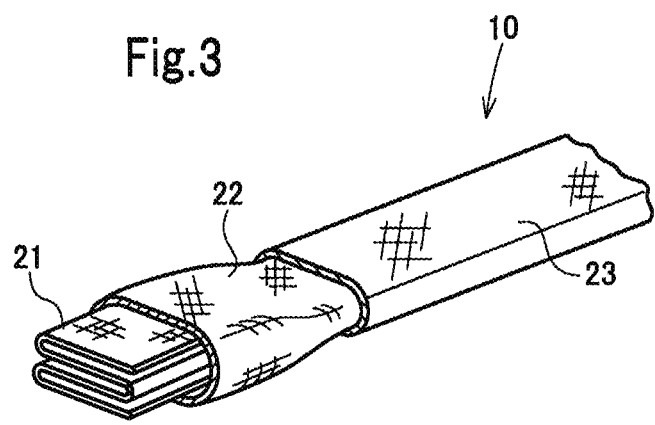
FIG. 3 is a cross-sectional perspective view of an intermediate portion in the longitudinal direction of the air belt in FIG. 2.
Figure 4:
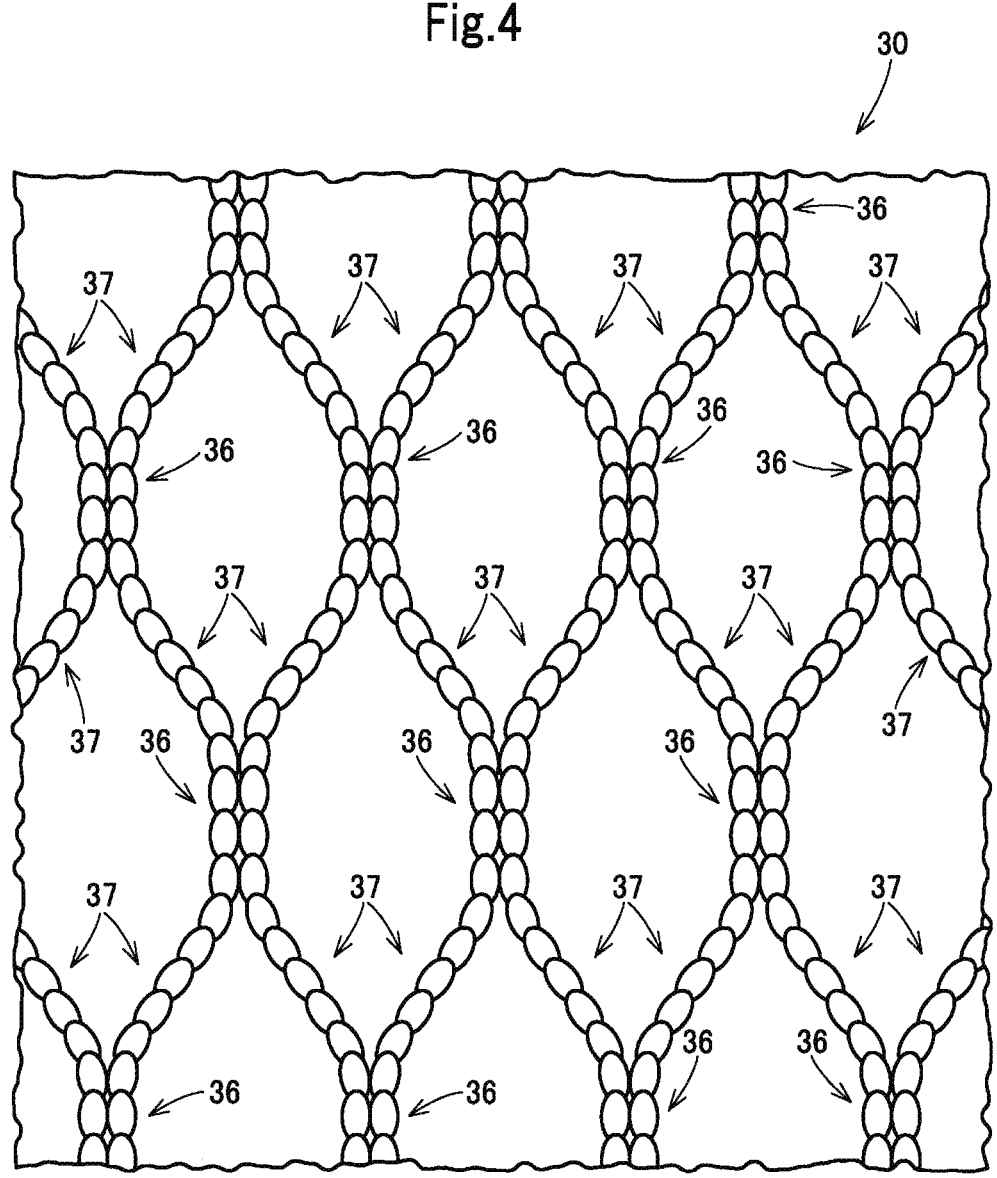
FIG. 4 is a schematic plan view of a knitted material forming mesh webbing of the air belt in FIG. 2.
Figure 5:
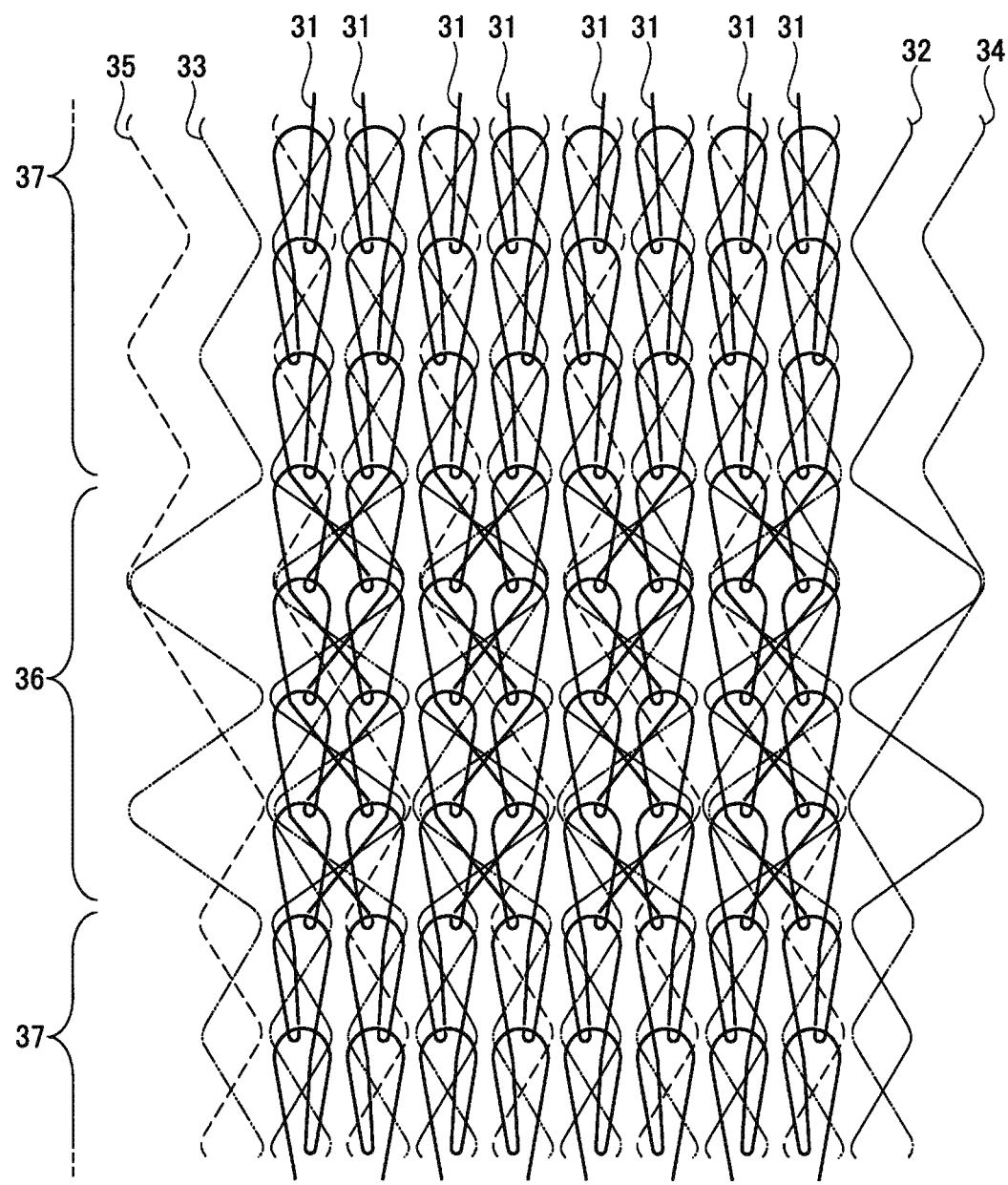
FIG. 5 is a plan view illustrating a knitted fabric of the knitted material in FIG. 4.
Figure 6A:
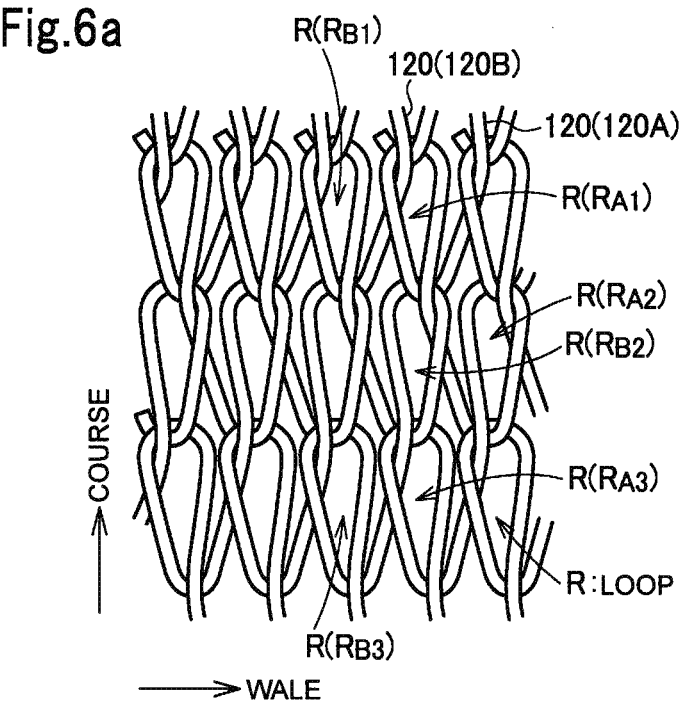
FIGS. 6a and 6b are explanatory diagrams of a knitted material forming mesh webbing of an air belt according to an existing example.
Figure 6B:
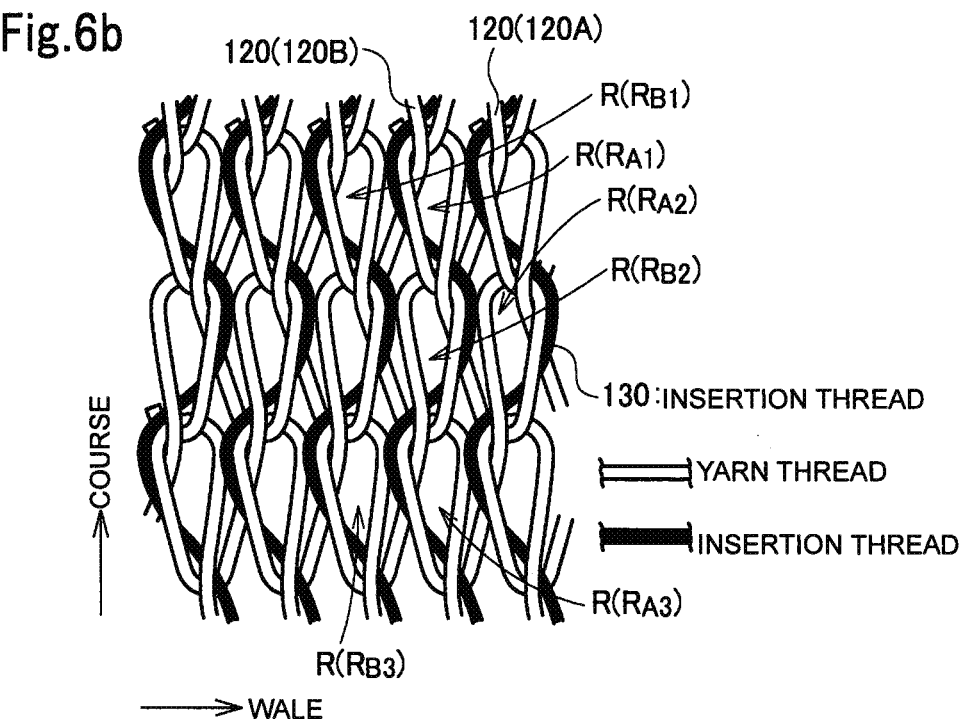

FIG. 1 is a perspective view of an air belt apparatus according to the embodiment when an air belt thereof is inflated. FIG. 2 is a plan view of the air belt according to the embodiment in an uninflated state. FIG. 3 is a cross-sectional perspective view of an intermediate portion in the longitudinal direction of the air belt. FIG. 4 is a schematic plan view of a knitted material forming mesh webbing of the air belt. FIG. 4 illustrates a state in which the knitted material is expanded in the circumferential direction of the mesh webbing. FIG. 5 is a plan view illustrating a knitted fabric of the knitted material. In the following description, the vertical direction, the horizontal direction, and the anteroposterior direction respectively refer to the vertical direction, the horizontal direction, and the anteroposterior direction for an occupant of a vehicle such as a car wearing the air belt.

As illustrated in FIG. 1, the air belt apparatus includes an air belt 10 forming a shoulder belt portion that passes an upper part of a shoulder (right shoulder in this embodiment) of an occupant seated in a seat of a vehicle such as a car (illustration omitted) and is routed across the front side of the upper half of the body of the occupant diagonally (from the upper right side to the lower left side in this embodiment), webbing 14 connected to the upper end of the air belt 10, a lap belt portion 11 routed in the horizontal direction across an upper part of the hips of the occupant, a buckle device 12 disposed to be adjacent to a lateral side (left side in this embodiment) of the seat, a tongue 13 that is inserted and locked in the buckle device 12 when the belt is worn, a shoulder anchor 18 attached to a pillar portion or the like of a vehicle body located on a side of the seat opposite to the buckle device 12 (right side in this embodiment) and having the webbing 14 hung therethrough, a retractor 15 that retracts the webbing 14, a retractor 16 that retracts the lap belt portion 11, and so forth. The retractors 15 and 16 are disposed on the side of the seat opposite to the buckle device 12.

The buckle device 12 is provided with an inflator 17. Gas ejected from the inflator 17 is introduced into the air belt 10.

As illustrated in FIG. 2, the tongue 13 includes a tongue plate 13a that is inserted in the buckle device 12 and a nozzle 13b for receiving and introducing the gas from the inflator 17 into the air belt 10.

The lap belt 11 has a tip end (left end in this embodiment) connected to the tongue 13 and a trailing end (right end in this embodiment) retractably connected to the retractor 16.

The air belt 10 includes a bag-shaped belt 21 that inflates with the gas introduced therein from the inflator 17, mesh webbing 22 covering the bag-shaped belt 21, a cover 23 attached around the exterior of the mesh webbing 22, and so forth.

As illustrated in FIGS. 2 and 3, the bag-shaped belt 21 is folded in an elongated band shape in the uninflated state. In the uninflated state of the bag-shaped belt 21, the mesh webbing 22 has an elongated tubular shape and wraps a folded member of the bag-shaped belt 21. The mesh webbing 22 is made of a knitted material 30 configured to be flexibly expandable in the circumferential direction but hardly expand in the longitudinal direction. The configuration of the knitted material 30 will be described in detail later. In this embodiment, substantially the entirety of the mesh webbing 22 is made of the knitted material 30. That is, in this embodiment, substantially the entirety of the mesh webbing 22 forms an expandable portion that expands in the circumferential direction in accordance with the inflation of the bag-shaped belt 21. The configuration of the mesh webbing 22 is not limited thereto. For example, the mesh webbing 22 may partially be made of a material other than the knitted material 30.

The aforementioned webbing 14 continues to the upper end of the mesh webbing 22. In this embodiment, the mesh webbing 22 and the webbing 14 are continuously made of the knitted material 30. A portion of the knitted material 30 forming the webbing 14 hardly expands in the longitudinal direction and the circumferential direction. A portion of the knitted material 30 forming the mesh webbing 22 and the portion of the knitted material 30 forming the webbing 14 are different in the structure of the knitted fabric (lengths of later-described knot portions 36 and leg portions 37, for example). The knitting pattern is changed by a pattern control device such that the portion forming the mesh webbing 22 and the portion forming the webbing 14 each have a predetermined knitted fabric. Accordingly, these portions are seamlessly and integrally knitted. With the mesh webbing 22 and the webbing 14 integrally knitted, stitching for connecting these together is unnecessary. Further, with this configuration, a reduction in strength caused by connecting these together by stitching or the like does not occur between the mesh webbing 22 and the webbing 14. A reference numeral 24 in FIG. 2 denotes a stitched portion (seam) for fastening the cover 23. The respective lower ends of the mesh webbing 22 and the bag-shaped belt 21 are connected to the tongue 13. The gas from the inflator 17 is introduced into the bag-shaped belt 21 through the aforementioned nozzle 13b.

In the uninflated state of the bag-shaped belt 21, the cover 23 also has an elongated tubular shape and wraps the mesh webbing 22. Each reference numeral 25 in FIG. 2 denotes a tear seam in which the cover 23, the mesh webbing 22, and the folded member of the bag-shaped belt 21 are stitched together to be integrated. The cover 23 is made of a material that does not easily expand in the circumferential direction. The cover 23 is configured to tear open during the inflation of the bag-shaped belt 21 to allow the inflation of the bag-shaped belt 21. In that event, the tear seams 25 also tear apart to cancel the integration of the cover 23, the mesh webbing 22, and the bag-shaped belt 21. The configuration of the cover 23 is not limited thereto.

As illustrated in FIG. 1, in this embodiment, the air belt 10 is configured to be thicker on the upper end side than on the lower end side when inflated. That is, in the inflated state of the air belt 10 in this embodiment, the upper end side of the air belt 10 forms a large inflated portion 10a, and the lower end side lower than the large inflated portion 10a forms a small inflated portion 10b. The arrangement of the large inflated portion 10a is not limited thereto. For example, the large inflated portion 10a may be arranged in an intermediate portion in the vertical direction of the air belt 10, and the upper end side and the lower end side of the air belt 10 upper and lower than the large inflated portion 10a, respectively, may each form the small inflated portion 10b. The large inflated portion 10a may be arranged on the lower end side of the air belt 10, and the upper end side upper than the large inflated portion 10a may form the small inflated portion 10b. Two or more large inflated portions 10a may be provided at different positions in the longitudinal direction of the air belt 10. The air belt 10 may be configured to have a substantially constant thickness from the upper end to the lower end thereof when inflated.

The knitted material 30 forming the mesh webbing 22 will now be described.

The knitted material 30 is raschel-knitted.

As illustrated in FIG. 5, the knitted material 30 is made of a plurality of yarn threads 31 and a plurality of insertion threads 32, 33, 34, and 35. In FIG. 5, the insertion thread 32 is indicated by a solid line, the insertion thread 33 is indicated by a dash-double dotted line, the insertion thread 34 is indicated by a dash-dotted line, and the insertion thread 35 is indicated by a dashed line.

As illustrated in FIGS. 4 and 5, in the raschel-knitted fabric, a plurality of knot portions 36 each formed by mutually adjacent yarn threads 31 and 31 knitted together are formed at predetermined intervals in the extending direction of the yarn threads 31. In the extending direction of the yarn threads 31, each of the yarn threads 31 is alternately knitted with the yarn threads 31 and 31 on both sides thereof, thereby forming the knot portions 36 in a zigzag manner. A portion of each of the yarn threads 31 located between adjacent knot portions 36 and 36 form a leg portion 37 connecting the knot portions 36 and 36 together. As illustrated in FIG. 4, the leg portions 37 extend in a bifurcated manner from each of the knot portions 36 toward one end and the other end in the extending direction of the yarn threads 31.

As illustrated in FIG. 4, the leg portions 37 and 37 extending from each of the knot portions 36 toward the one end in the extending direction of the yarn threads 31 separate from each other in a diverging manner, and the leg portions 37 and 37 extending from each of the knot portions 36 toward the other end in the extending direction of the yarn threads 31 separate from each other in a diverging manner. Thereby, the knitted material 30 expands in a direction perpendicular to the direction extending from the one end toward the other end of the yarn threads 31.

As illustrated in FIGS. 4 and 5, in each of the leg portions 37, the yarn thread 31 is knitted in chain stitch to form a plurality of loops continuing in the extending direction of the leg portion 37.

As illustrated in FIG. 5, in each of the knot portions 36, mutually adjacent yarn threads 31 and 31 are knitted to form a plurality of loops in a zigzag manner from the one end toward the other end thereof while alternately changing sides and intertwining with each other. That is, in each of the knot portions 36, two loop strings each including a plurality of continuous loops are formed in parallel. In the present invention, the extending direction of the knot portions 36 refers to the extending direction of these loop strings. In each of the loop strings, the loops formed by one of the mutually adjacent yarn threads 31 and 31 and the loops formed by the other yarn thread 31 are alternately arranged. While moving back and forth between these loop strings, each of the yarn threads 31 passes through the loops formed by the other yarn thread 31 and cross the other yarn thread 31 between the loop strings. Thereby, the mutually adjacent yarn threads 31 and 31 are bound together in each of the knot portions 36. The length of each of the knot portions 36 is proportional to the number of loops included in one loop string in the knot portion 36.

As illustrated in FIG. 5, the insertion threads 32 to 35 are divided into pairs of two threads, inserted in the leg portions 37, merged at the knot portions 36, and thereafter separated into different pairs of two threads and inserted in the leg portions 37 on the opposite side. In the leg portions 37, the insertion threads 32 to 35 are routed from one end toward the other end in the extending direction of the leg portions 37 to sequentially pass through the loops continuing in the extending direction. In the knot portions 36, the insertion threads 32 to 35 are routed from one end toward the other end in the extending direction of the knot portions 36 to sequentially pass through the loops of the loop strings continuing in the extending direction and continuously pass through the loops of one of the adjacent loop strings and the loops of the other loop string.

Normally, polyester or nylon is preferable as the yarn threads 31 forming the knitted material 30. Particularly, polyester is preferable. It is preferable that the thickness of each of the yarn threads ranges from 500 to 3000 denier, particularly from 1000 to 2000 denier. It is preferable that the yarn thread stitch density of the knitted material 30 ranges from 4 to 10 courses/cm, particularly from 5 to 7 courses/cm.

The knitted material 30 is subjected to heat-drawing processing so as not to expand in a direction parallel to the extending direction of the knot portions 36 (i.e., the longitudinal direction of the mesh webbing 22). Thereby, the knitted material 30 hardly expands in the direction parallel to the extending direction of the knot portions 36, but is flexibly expandable in a direction perpendicular thereto (i.e., the circumferential direction of the mesh webbing 22).

To form the mesh webbing 22 with the knitted material 30, the knitted material 30 is arranged such that the extending direction of the knot portions 36 is substantially parallel to the longitudinal direction of the bag-shaped belt 21. The knitted material 30 may originally be knitted in a tubular shape, or may be knitted in a plain knitted material and thereafter rolled in a tubular shape with opposite end portions thereof in the rolling direction joined together by stitching or the like to thereby form the tubular mesh webbing 22.

In this embodiment, the entirety of the mesh webbing 22 is made of the continuous knitted material 30. That is, a portion of the knitted material 30 arranged for the large inflated portion 10a of the air belt 10 and a portion of the knitted material 30 arranged for the small inflated portion 10b of the air belt 10 are continuously knitted with the yarn threads 31 and the insertion threads 32 to 35 common thereto.

In this embodiment, the knitted material 30 is knitted such that the length of each of the knot portions 36 in the portion arranged for the small inflated portion 10b is greater than the length of each of the knot portions 36 in the portion arranged for the large inflated portion 10a. That is, in the knitted material 30, the number of loops of the yarn threads 31 included in each of the aforementioned loop strings of the knot portions 36 in the portion arranged for the small inflated portion 10b is larger than the number of loops of the yarn threads 31 included in each of the aforementioned loop strings of the knot portions 36 in the portion arranged for the large inflated portion 10a. To knit the knitted material 30 in such a manner, it suffices if the length of the knot portions and the length of the leg portions are changed where necessary in accordance with a program with a computer pattern (fabric) control device, with the configuration of a knitting machine (illustration omitted) per se unchanged. With the knitted material 30 thus knitted, it is possible to make the amount of expansion in the circumferential direction of the portion of the knitted material 30 arranged for the small inflated portion 10b less than the amount of expansion in the circumferential direction of the portion of the knitted material 30 arranged for the large inflated portion 10a.

In this embodiment, the length of each of the leg portions 37 in the portion of the knitted material 30 arranged for the small inflated portion 10b is equal to the length of each of the leg portions 37 in the portion of the knitted material 30 arranged for the large inflated portion 10a. That is, the number of loops of the yarn thread 31 included in each of the leg portions 37 in the portion of the knitted material 30 arranged for the small inflated portion 10b is equal to the number of loops of the yarn thread 31 included in each of the leg portions 37 in the portion of the knitted material 30 arranged for the large inflated portion 10a. The knitted material 30 may be configured such that the number of loops of the yarn thread 31 included in each of the leg portions 37 in the portion of the knitted material 30 arranged for the large inflated portion 10a is larger than the number of loops of the yarn thread 31 included in each of the leg portions 37 in the portion of the knitted material 30 arranged for the small inflated portion 10b, to thereby make the amount of expansion of the knitted material 30 larger in the large inflated portion 10a.

The number of loops of the yarn threads 31 included in each of the aforementioned loop strings of the knot portions 36 in the portion of the knitted material 30 arranged for the small inflated portion 10b is preferably one to ten, particularly preferably one to five. The number of loops included in each of the leg portions 37 in the portion of the knitted material 30 arranged for the small inflated portion 10b is preferably one to five, particularly preferably one to two. Further, the number of loops of the yarn threads 31 included in each of the aforementioned loop strings of the knot portions 36 in the portion arranged for the large inflated portion 10a is preferably one to ten, particularly preferably one to five. The number of loops included in each of the leg portions 37 in the portion arranged for the large inflated portion 10a is preferably three to ten, particularly preferably four to five.

In this embodiment, the bag-shaped belt 21 per se is configured to be substantially constant in thickness over the entire length thereof when inflated without being covered with the mesh webbing 22. That is, in this embodiment, the inflation of the bag-shaped belt 21 is restrained by the mesh webbing 22 in the small inflated portion 30b. When the bag-shaped belt 21 inflates, therefore, the thickness of the air belt 10 in the small inflated portion 30b is less than the thickness of the air belt 10 in the large inflated portion 10a.

The configuration of the bag-shaped belt 21 and the mesh webbing 22 is not limited thereto. For example, the bag-shaped belt 21 per se may be configured to inflate with a relatively large thickness in the large inflated portion 10a and inflate with a smaller thickness in the small inflated portion 10b. In this case, the mesh webbing 22 may be configured to be substantially constant in the amount of expansion in the circumferential direction thereof over the entire length thereof.

The operation of the air belt apparatus including the air belt 10 is as follows.

When the inflator 17 operates in the event of collision or rollover of the vehicle, for example, gas is introduced into and inflates the bag-shaped belt 21. In this case, the cover 23 tears open, and the tear seams 25 tear apart to allow the inflation of the bag-shaped belt 21.

The mesh webbing 22 expands in the circumferential direction thereof in accordance with the inflation of the bag-shaped belt 21. As described above, the mesh webbing 22 flexibly expands in the circumferential direction thereof but hardly expands in the longitudinal direction thereof. When the mesh webbing 23 is increased in diameter in accordance with the inflation of the bag-shaped belt 21, therefore, the length of the mesh webbing 23 is reduced. Thereby, pretension is applied to the air belt 10 and the webbing 14.

Accordingly, the occupant is restrained to the seat. Further, impact applied to the occupant by the shoulder belt portion is mitigated by the inflated bag-shaped belt 21.

In this embodiment, the upper end side of the air belt 10 forms the large inflated portion 10a and inflates with a relatively large thickness. It is therefore possible to sufficiently restrain the head of the occupant with the inflated large inflated portion 10a.

Operational effects provided by the air belt 10 are as follows.

In the air belt 10, the mesh webbing 22 is made of the raschel-knitted material 30. Further, the knitted material 30 is arranged such that the extending direction of the knot portions 36 of the yarn threads 31 corresponds to the longitudinal direction of the air belt 10.

As described above, in the knitted fabric of the raschel-knitted material 30, the portion of each of the yarn threads 31 located between the mutually adjacent knot portions 36 and 36 forms the leg portion 37 connecting the knot portions 36 and 36 together. Further, the leg portions 37 extend in the bifurcated manner from each of the knot portions 36 toward the one end and the other end in the longitudinal direction of the air belt 10. The leg portions 37 and 37 extending from each of the knot portions 36 toward the one end in the longitudinal direction of the air belt 10 separate from each other in the diverging manner, and the leg portions 37 and 37 extending from each of the knot portions 36 toward the other end in the longitudinal direction of the air belt 10 separate from each other in the diverging manner. Thereby, the knitted material 30 expands in the circumferential direction of the bag-shaped belt 21. In the air belt 10, therefore, the amount of expansion in the circumferential direction of the mesh webbing 22 is practically determined by the length of each of the knot portions 36 and the length of each of the leg portions 37 in the knitted fabric. That is, it is possible to increase the amount of expansion in the circumferential direction of the mesh webbing 22 by reducing the length of each of the knot portions 36 and/or increasing the length of each of the leg portions 37 in the knitted fabric, even if the yarn thread stitch density of the knitted material 30 is increased.

The increase of the yarn thread stitch density of the knitted material 30 results in improvement of the abrasion resistance, the scratch resistance, and the fire resistance of the knitted material 30 and the restraining performance of the knitted material 30 when covering the folded member of the bag-shaped belt 21. Further, the raschel-knitted material 30 does not easily ravel even if the yarn threads 31 are cut.

Accordingly, it is possible to configure the mesh webbing 22 to be sufficiently strong and sufficiently expandable in the circumferential direction of the bag-shaped belt 21.

In this embodiment, the knitted material 30 is configured such that the length of the knot portions 36 in the portion of the knitted material 30 arranged for the small inflated portion 10b of the air belt 10 is less than the length of the knot portions 36 in the portion of the knitted material 30 arranged for the large inflated portion 10a of the air belt 10, to thereby reduce the amount of expansion of the knitted material 30 in the circumferential direction of the bag-shaped belt 21 in the small inflated portion 10b. In the small inflated portion 10b during the inflation of the bag-shaped belt 21, therefore, the inflation of the bag-shaped belt 21 is restricted by the knitted material 30, and the air belt 10 becomes thinner than in the large inflated portion 10a. With this configuration, it is unnecessary to change the thickness of the inflated bag-shaped belt 21 per se between the large inflated portion 10a and the small inflated portion 10b of the air belt 10. Thus, it possible to simplify the configuration of the bag-shaped belt 21.

In this embodiment, the portion of the knitted material 30 arranged for the large inflated portion 10a of the air belt 10 and the portion of the knitted material 30 arranged for the small inflated portion 10b of the air belt 10 are continuously knitted. Therefore, the configuration of the mesh webbing 22 is also simple. As described above, to continuously knit the knitted material 30 by changing the length of the knot portions 36 depending on the location, it suffices if the length of the knot portions and the length of the leg portions are changed where necessary in accordance with a program with a computer pattern (fabric) control device, with the configuration of a knitting machine per se unchanged. Therefore, the manufacturing of the mesh webbing 22 is also simple.

In this embodiment, the yarn threads 31 forming the knitted material 30 are normally made of polyester or nylon. Further, the thickness of the yarn threads 31 ranges from 500 to 3000 denier, and the stitch density of the yarn threads 31 ranges from 4 to 10 courses/cm. It is therefore possible to configure the mesh webbing 22 to be sufficiently strong.

The above-described embodiment illustrates an example of the present invention, and the present invention is not limited to the above-described configuration.

For example, in the above-described embodiment, the air belt 10 forms the shoulder belt portion diagonally routed across the front side of the upper half of the body of the occupant. The air belt 10, however, may form the lap belt portion routed in the horizontal direction across the upper part of the hips of the occupant.

Although the present invention has been described in detail with a specific mode, it is obvious to a person skilled in the art that the present invention may be modified in various ways without departing from the intension and scope thereof.

The invention claimed is:

1. An air belt comprising:
 a folded member being a bag-shaped belt that inflates with gas introduced therein and is folded in a band shape; and
 mesh webbing covering the folded member of the bag-shaped belt, with at least a portion of the mesh webbing forming an expandable portion that expands at least in the circumferential direction of the bag-shaped belt during the inflation of the bag-shaped belt, the air belt being characterized in that at least the expandable portion of the mesh webbing is made of a raschel-knitted material, and
 that the knitted material is arranged such that the extending direction of knot portions of yarn threads corresponds to the longitudinal direction of the air belt characterized in that the air belt includes a large inflated portion that has a relatively large thickness when the bag-shaped belt inflates and a small inflated portion that is smaller in thickness than the large inflated portion when the bag-shaped belt inflates,
 that the knitted material is arranged for the large inflated portion and the small inflated portion,
 that the knitted material arranged for the small inflated portion is knitted such that the length of the knot portions thereof is greater than the length of the knot portions of the knitted material arranged for the large inflated portion, thereby making the amount of expansion of the knitted material arranged for the small inflated portion in the circumferential direction of the bag-shaped belt less than the amount of expansion of the knitted material arranged for the large inflated portion in the circumferential direction of the bag-shaped belt, and
 that the inflation of the bag-shaped belt is restricted by the knitted material in the small inflated portion.

2. The air belt according to claim 1, characterized in that the length of leg portions connecting adjacent ones of the knot portions is equal between the portion of the knitted material arranged for the large inflated portion and the portion of the knitted material arranged for the small inflated portion.

3. The air belt according to claim 1, characterized in that the yarn threads forming the knitted material are knitted to form loop strings each including a plurality of loops continuing in the longitudinal direction of the air belt,
 that, in the portion of the knitted material arranged for the large inflated portion, the loop strings forming the knot portions each include one to ten loops, and the loop strings forming the leg portions each include three to ten loops, and
 that, in the portion of the knitted material arranged for the small inflated portion, the loop strings forming the knot portions each include one to ten loops, and the loop strings forming the leg portions each include one to five loops.

4. The air belt according to claim 1, characterized in that the knitted material arranged for the large inflated portion and the knitted material arranged for the small inflated portion are continuously knitted with the yarn threads common thereto.

5. The air belt according to claim 1, characterized in that the yarn threads forming the knitted material are made of polyester or nylon, the thickness of the yarn threads ranges from 500 to 3000 denier, and the stitch density of the yarn threads ranges from 4 to 10 courses/cm.

6. An air belt apparatus comprising:
 the air belt described in claim 1; and
 an inflator for inflating the bag-shaped belt of the air belt.

* * * * *